United States Patent
Ghosh et al.

(10) Patent No.: US 9,477,683 B2
(45) Date of Patent: *Oct. 25, 2016

(54) TECHNIQUES FOR ENABLING COARSE-GRAINED VOLUME SNAPSHOTS FOR VIRTUAL MACHINE BACKUP AND RESTORE

(71) Applicant: INTERNATIONAL BUSINESS MACHINES CORPORATION, Armonk, NY (US)

(72) Inventors: Rahul Ghosh, Morrisville, NC (US); Aaron James Quirk, Cary, NC (US); James Patrick Robbins, Austin, TX (US); Drew Hoover Sternesky, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/291,694

(22) Filed: May 30, 2014

(65) Prior Publication Data

US 2015/0347430 A1 Dec. 3, 2015

(51) Int. Cl.
*G06F 17/30* (2006.01)
*G06F 11/14* (2006.01)

(52) U.S. Cl.
CPC ......... *G06F 17/30233* (2013.01); *G06F 11/14* (2013.01); *G06F 17/30088* (2013.01)

(58) Field of Classification Search
None
See application file for complete search history.

(56) References Cited

U.S. PATENT DOCUMENTS

| | | | | |
|---|---|---|---|---|
| 5,819,292 A * | 10/1998 | Hitz | ..................... | G06F 11/1435 707/999.203 |
| 7,809,691 B1 * | 10/2010 | Karmarkar | .......... | G06F 11/1469 707/674 |
| 8,108,640 B1 * | 1/2012 | Holl, II | ............... | G06F 11/1458 711/162 |
| 8,255,634 B2 * | 8/2012 | Young | ............... | G06F 2201/815 711/137 |
| 8,572,338 B1 | 10/2013 | Marathe et al. | | |
| 9,235,535 B1 * | 1/2016 | Shim | ....... | G06F 12/16 |
| 2008/0282047 A1 * | 11/2008 | Arakawa | ............. | G06F 11/1451 711/162 |
| 2009/0210462 A1 * | 8/2009 | Arakawa | ............. | G06F 11/1458 |
| 2010/0077165 A1 * | 3/2010 | Lu | ........................ | G06F 11/1451 711/162 |
| 2014/0095817 A1 | 4/2014 | Hsu et al. | | |
| 2015/0089171 A1 * | 3/2015 | Fujita | .................. | G06F 11/1451 711/162 |

* cited by examiner

*Primary Examiner* — Bai D. Vu
(74) *Attorney, Agent, or Firm* — Michael R. Long; Richard Wilhelm

(57) ABSTRACT

A technique of backing up a workload in a virtual environment includes identifying one or more files that are associated with the workload. One or more source volumes that include the one or more files are identified. A respective target volume is provisioned for each of the one or more source volumes identified. Only dirty blocks are copied (in a snapshot mode that prevents an update to the one or more source volumes during the snapshot mode) from each of the one or more source volumes to its respective target volume. The one or more dirty blocks are then copied from each target volume to a backup medium.

13 Claims, 7 Drawing Sheets

TECHNIQUES FOR ENABLING COARSE-GRAINED VOLUME SNAPSHOTS FOR VIRTUAL MACHINE BACKUP AND RESTORE

BACKGROUND

The present disclosure generally relates to techniques for enabling coarse-grained volume snapshots for virtual machine backup and restore and, more specifically, to techniques for enabling coarse-grained volume snapshots for virtual machine backup and restore while minimizing performance impact and virtual disk footprint.

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (PM), e.g., a computer system, that executes instructions like a PM. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying PM resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

The IBM® Storwize® V7000 system provides copy services features that facilitate copying volumes or logical unit numbers (LUNs). The Storwize® V7000 FlashCopy function transfers a point-in-time copy of a source volume to a designated target volume. In its basic mode, the FlashCopy function copies the contents of a source volume to a target volume. In this case, any data that existed on the target volume is lost and is replaced by the copied data. The FlashCopy function is sometimes described as an instance of a time-zero (T0) copy technology. Although it is difficult to make a consistent copy of a dataset that is constantly updated, point-in-time copy techniques facilitate consistently copying datasets that are constantly updated.

If a copy of a dataset is created using a technology that does not provide point-in-time techniques and the dataset changes during the copy operation, the resulting copy may contain data that is not consistent. For example, if a reference to an object is copied earlier than the object itself and the object is moved before it is copied, the copy contains the referenced object at its new location, but the copied reference still points to the previous location. More advanced FlashCopy functions allow operations to occur on multiple source and target volumes. FlashCopy management operations are coordinated to provide a single common point-in-time for copying source volumes to their respective target volumes. In this manner, the FlashCopy function may be used to create a consistent copy of data that spans multiple volumes. The FlashCopy function also allows multiple target volumes to be copied from each source volume to facilitate creating images from different points-in-time for each source volume.

When a volume is created, the volume can be designated as a thin-provisioned volume with a virtual capacity and a real capacity. The virtual capacity is the volume storage capacity that is available to a host. The real capacity is the storage capacity that is allocated to a volume from a storage pool. In a fully allocated volume, the virtual capacity and real capacity are the same. In a thin-provisioned volume, however, the virtual capacity can be much larger than the real capacity. Each system uses the real capacity to store data that is written to the volume and metadata that describes the thin-provisioned configuration of the volume. As more information is written to the volume, more of the real capacity is used.

Thin-provisioned volumes can help simplify server administration. For example, instead of assigning a volume with some capacity to an application and increasing that capacity as the needs of the application change, a volume can be configured with a large virtual capacity for the application, and the real capacity can be increased or decreased, as storage requirements of the application change, without disrupting the application or server. However, input/output (I/O) rates that are obtained from thin-provisioned volumes can be slower than those obtained from fully allocated volumes that are allocated on the same managed disk due to the need to access and process the extra metadata describing the contents of thin-provisioned volumes.

BRIEF SUMMARY

Disclosed are a method, a data processing system, and a computer program product (embodied in a computer-readable storage medium) for enabling coarse-grained volume snapshots for virtual machine backup and restore while minimizing performance impact and virtual disk footprint.

A technique of backing up a workload in a virtual environment includes identifying one or more files that are associated with the workload. One or more source volumes that include the one or more files are identified. A respective target volume is provisioned for each of the one or more source volumes identified. Only dirty blocks are copied (in a snapshot mode that prevents an update to the one or more source volumes during the snapshot mode) from each of the one or more source volumes to its respective target volume. The one or more dirty blocks are then copied from each target volume to a backup medium.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
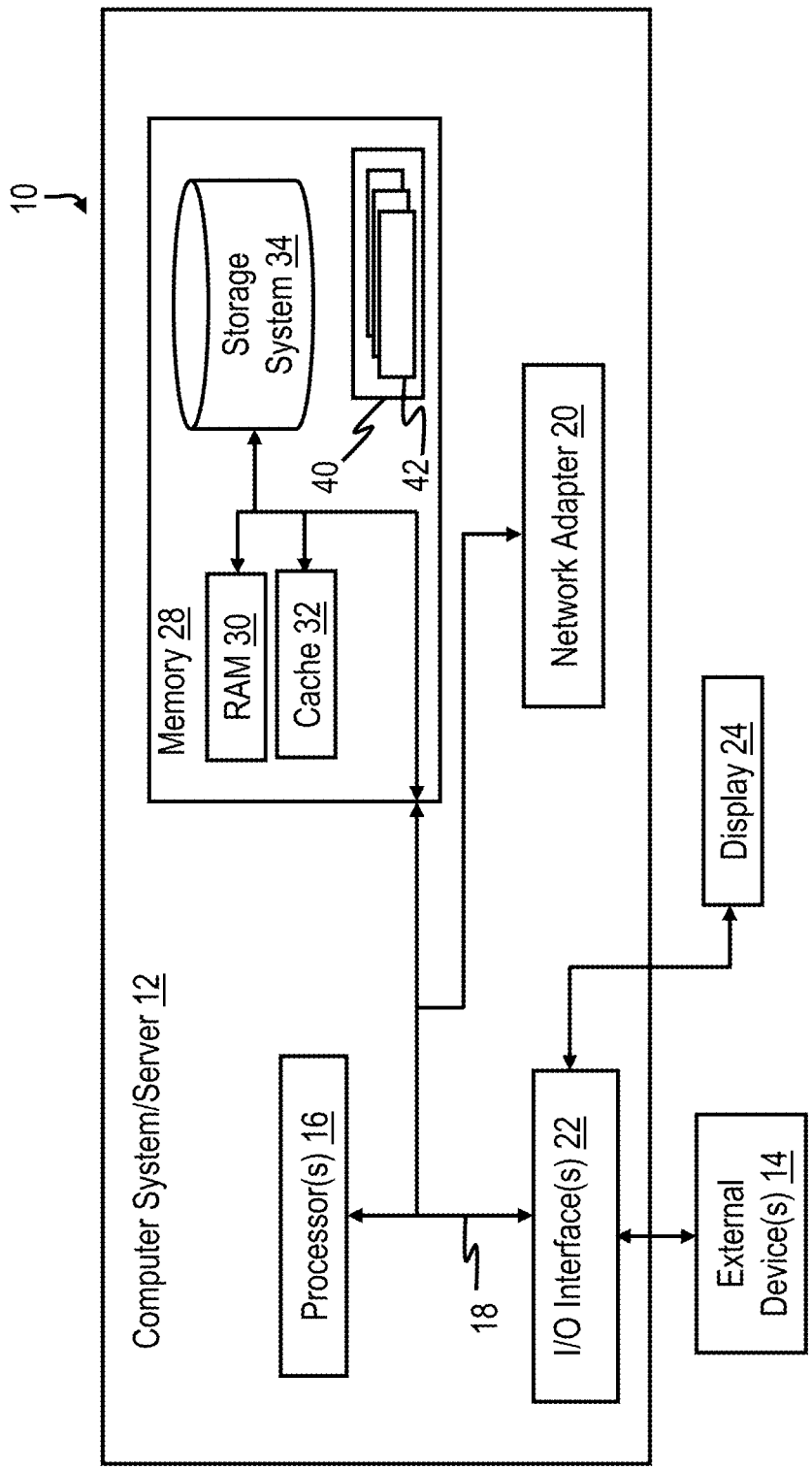
FIG. 1 depicts a relevant portion of an exemplary cloud computing node that is configured according to an embodiment of the present disclosure.

The illustrative embodiments provide a method, a data processing system, and a computer program product (embodied in a computer-readable storage medium) for enabling coarse-grained volume snapshots for virtual machine backup and restore while minimizing performance impact and virtual disk footprint.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server (or generally data processing system) 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media (also referred to herein as computer-readable storage devices). System memory 28 can include computer system readable media in the form of volatile memory, such as random access memory (RAM) 30 and/or cache memory 32 (also referred to herein as computer-readable storage devices).

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more other devices that enable a user to interact with computer system/server 12, and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
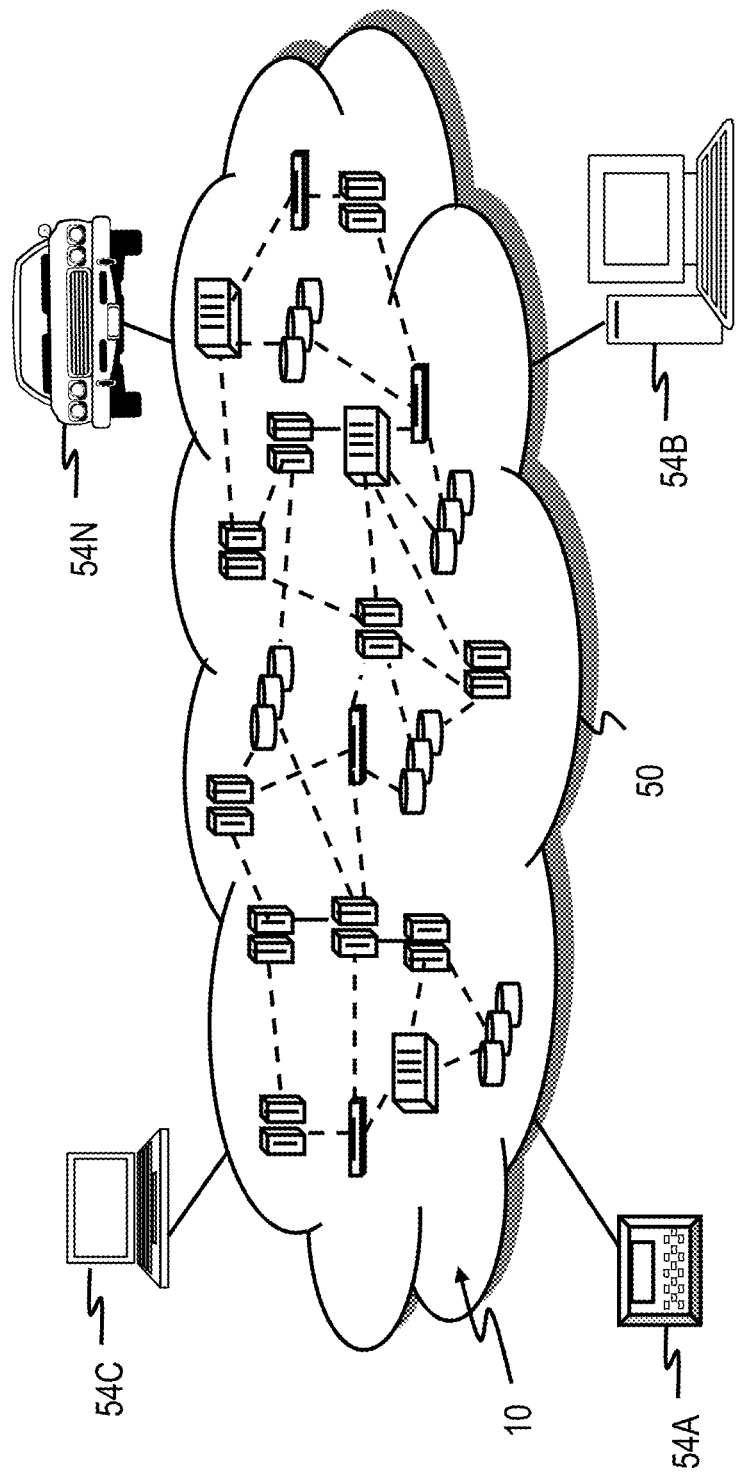
FIG. 2 depicts a relevant portion of an exemplary cloud computing environment that is configured according to one embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices MA-N shown in FIG. 2 are intended to be illustrative only and that computing nodes 10 and cloud computing environment 50 can communicate with any type of computerized device over any type of network and/or network addressable connection (e.g., using a web browser).

Figure 3:
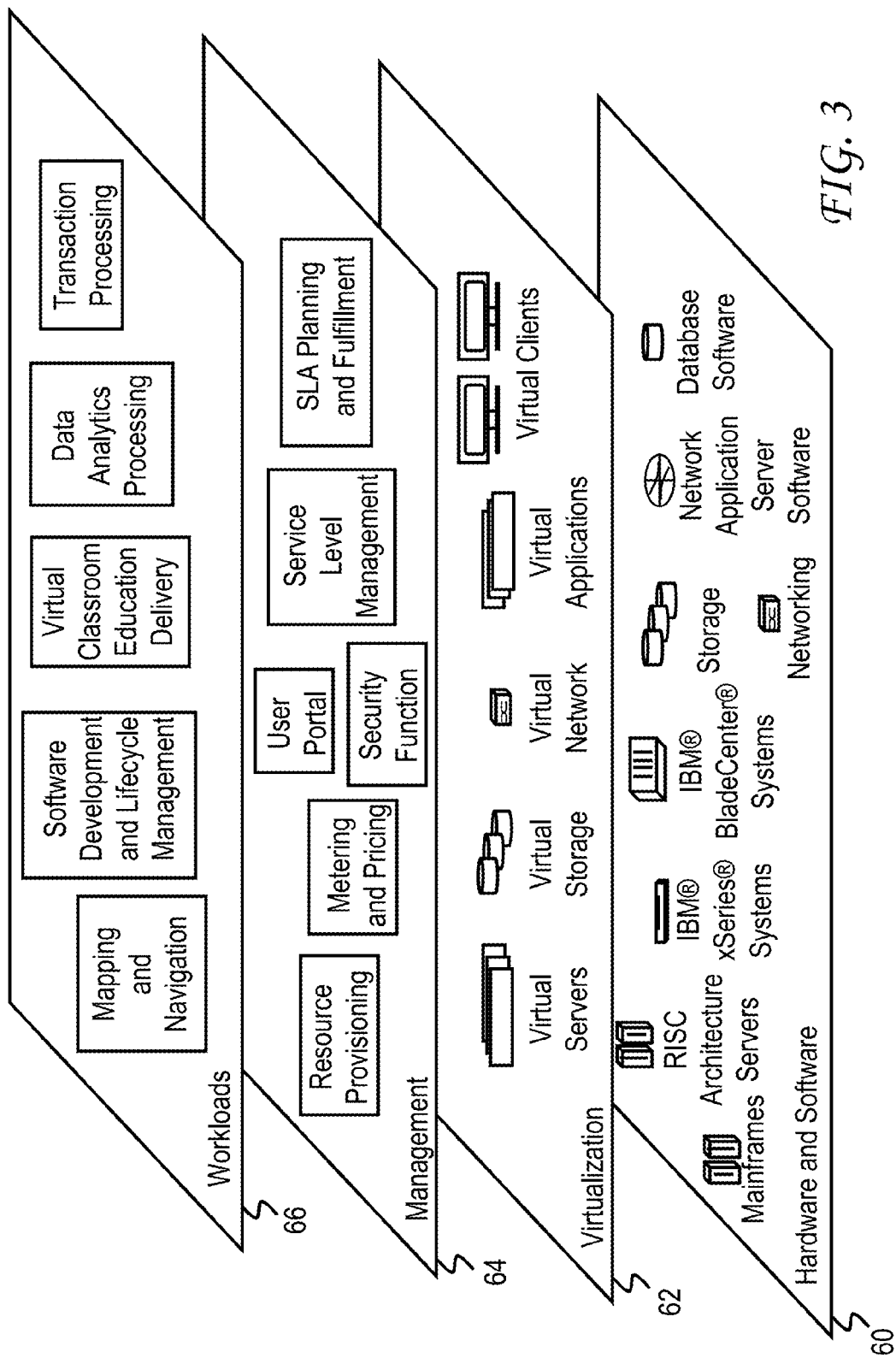
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM® pSeries® systems), IBM® xSeries® systems, IBM® BladeCenter® systems, storage devices, networks and networking components. As another example, the software components may include network application server software (e.g., IBM® WebSphere® application server software) and database software (e.g., IBM® DB2® database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) or hypervisors that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. For example, the resource provisioning function may be performed for virtual machines (VMs) by one or more VMMs. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a VM image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

VM or logical partition (LPAR) backup and restore is a key component of cloud lifecycle management. Timely backup of VM virtual disks can prevent the loss of data in case of system-wide catastrophic failures. While maintaining a regular backup schedule is important, an overall backup operation should ideally minimally impact workloads executing in a VM. Conventional disk snapshot is an efficient way to execute a backup on a live VM while minimizing backup time. However, conventional disk snapshot has some drawbacks that prevent effective usage in many scenarios. For example, some conventional disk snapshot mechanisms (RedHat KVM snapshot, VMware VMDK snapshot, etc.) transform content of an original disk into read-only content and create delta disks that can grow in size.

Figure 4:
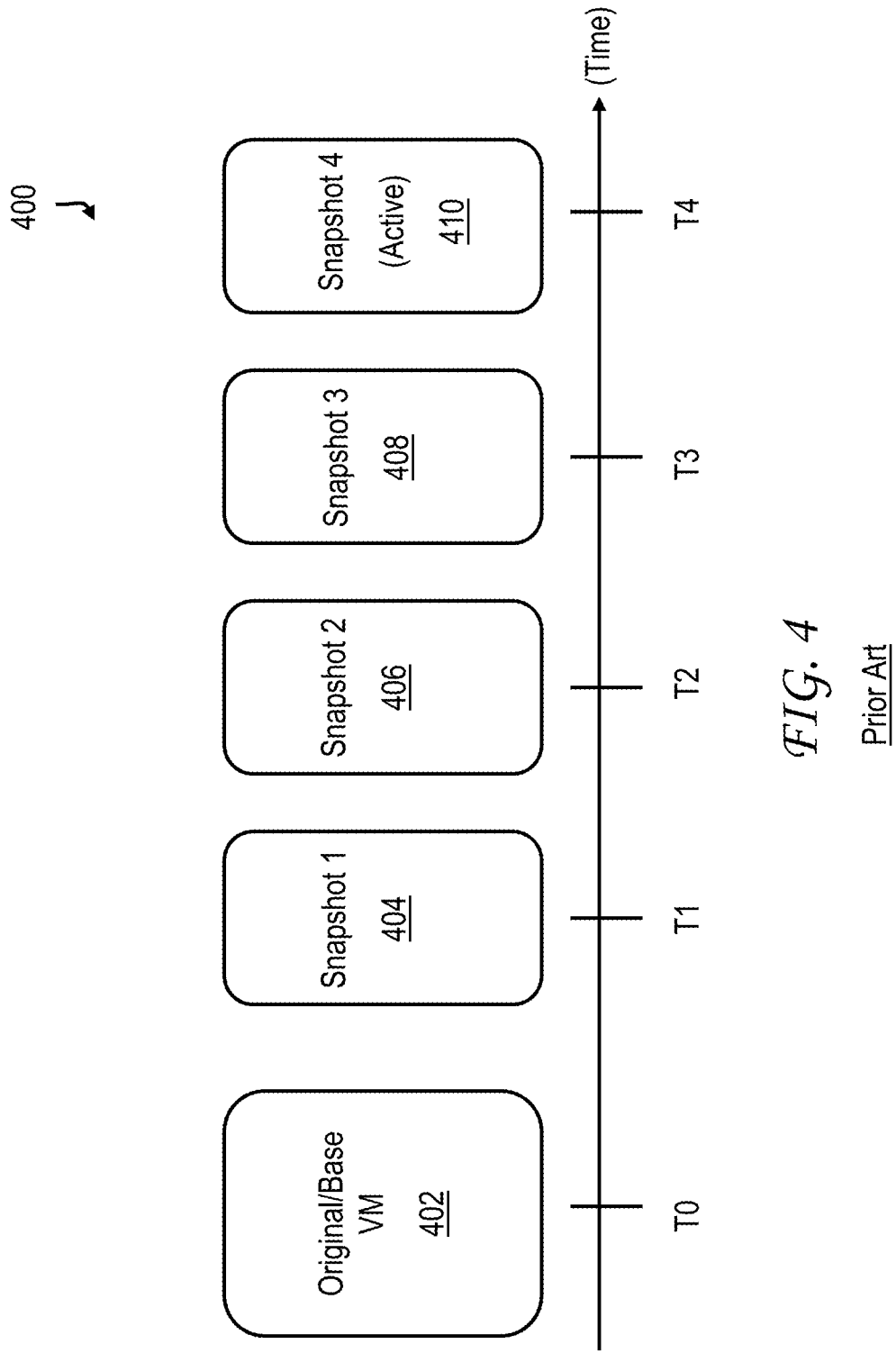
FIG. 4 is a diagram of a conventional snapshot mechanism in which four snapshots are taken of an original/base virtual machine (VM)

With reference to FIG. 4, a diagram 400 illustrates a conventional snapshot mechanism in which four snapshots 404, 406, 408, and 410 are taken of an original/base VM 402. In this example, original/base VM 402 is established at time T0, and thereafter, read-only snapshots 404, 406, 408 and 410 are taken of the changes to original/base VM 402 at times T1-T4, respectively. Because read-only snapshots 404-410 do not contain the original content of original/base VM 402, but only changes to that original content, read-only snapshots 404-410 are commonly referred to as "delta disks." More specifically, snapshot 404 includes the changes to VM 402 at time T1 and snapshot 406 includes the additional changes to VM 402 between times T1 and T2. Similarly, snapshot 408 includes the additional changes to VM 402 between times T2 and T3 and snapshot 410 includes the additional changes to VM 402 between times T3 and T4.

Although backup operations run relatively fast with conventional snapshot mechanisms, restoring a VM to a point-in-time can be a tedious task. This is primarily because delta disks (e.g., read-only disks 404, 406, 408, and 410) do not have the content of original/base disk (e.g., read-only disk 402) and/or the content from prior delta disks. To restore a VM to a point-in-time, snapshots are merged or block-pulled towards an active disk. Unfortunately, merge operations can be I/O intensive and adversely impact the performance of a hypervisor that hosts a VM, as well as the performance of workloads executing inside the VM.

Another class of snapshot technologies (e.g., IBM® Storwize® FlashCopy, Linux logical volume manager (LVM) snapshot, etc.) facilitate creating snapshots at a larger granularity. These snapshot approaches can effectively clone an entire logical unit number (LUN) or source volume. However, the larger granularity snapshot technologies also require merge operations before restore is possible. Additionally, the larger granularity snapshot technologies are not immediately useful for the purpose of VM snapshot, as virtual disks of a VM are often represented as individual files within a storage volume and are too fine-grained to leverage the larger granularity snapshot technologies. For example, a snapshot of an entire storage volume would unfortunately capture all the files on the volume even when a VM backup only requires a specific set of files on the volume.

In general, LVM snapshot incurs higher storage overhead than the disclosed techniques because LVM snapshot does not employ thin-provisioning and, as such, the actual storage space required after the snapshot is higher with LVM snapshot. In systems that implement a cluster of machines with failover capability, managing LVM snapshot becomes even more difficult and in some cases infeasible without an extra management layer. In addition, conventional hardware-assisted volume snapshot technologies (e.g., IBM® Storwize® FlashCopy) have operated at the volume level, as contrasted with the file level.

According to the present disclosure, hardware-assisted volume snapshot is uniquely applied to create a thin-provisioned target volume to maintain deltas (i.e., dirty blocks of specific files) from a source volume. In this manner, the disclosed techniques leverage volume-based snapshot without the disk footprint of an entire volume. According to the present disclosure, a new target (or shadow) volume may be mounted directly at any given time with contents appearing as they did at the time of the snapshot, which enables specific files (such as virtual disks, etc.) to be extracted from the volume-based snapshot asynchronously.

According to the present disclosure, techniques are disclosed that provide an efficient strategy for managing VM snapshots to optimize future restore operations while minimizing impact on hypervisor and VM performance. In general, leveraging hardware-assisted volume snapshots to backup individual files reduces I/O operations per second (IOPS) requirements for each operation, reduces a disk footprint required for backup operations, and facilitates reduction in both backup and restore times. In one embodiment a hardware-assisted volume snapshot feature (such as FlashCopy, which is available on the StorWize® family of storage controllers, e.g., the V7000) is employed. According to one or more embodiments, a temporary volume snapshot is provisioned at the desired backup time using a combination of thin-provisioning for a target volume and a specific setting for the FlashCopy function to reduce the overall storage footprint. It should be appreciated that the disclosed techniques are not limited to Storwize® or the FlashCopy function.

Figure 5:
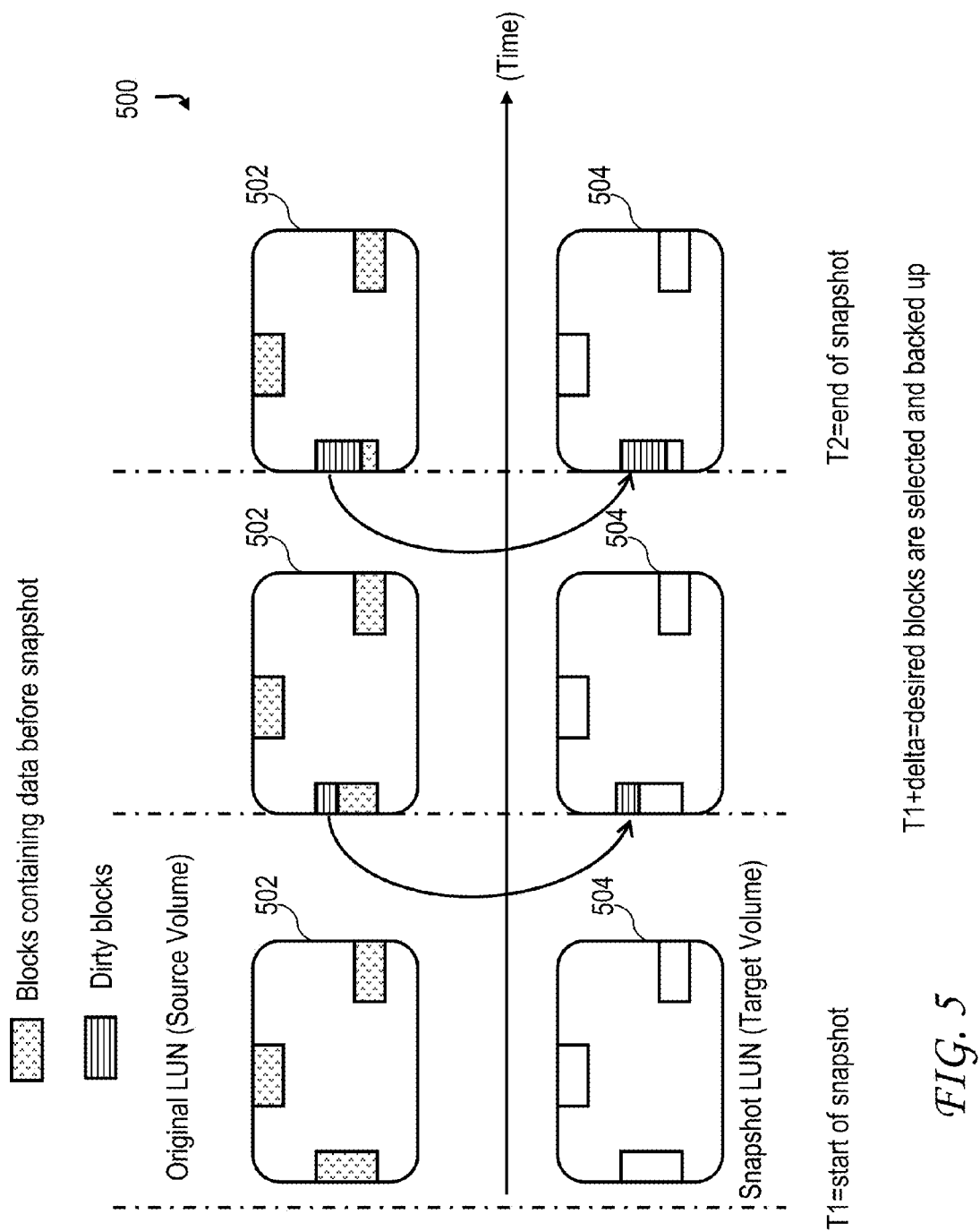
FIG. 5 depicts a diagram of an exemplary process for performing a snapshot, according to an embodiment of the present disclosure, in which as dirty blocks are written into an original logical unit number (LUN) or source volume blocks containing backup data are pushed to a snapshot LUN or target volume.

With reference to FIG. 5, a diagram 500 of an exemplary process for performing a snapshot, according to an embodiment of the present disclosure, is illustrated. As is shown, as dirty blocks are written into an original logical unit number (LUN) or source volume 502, files with blocks containing backup data are pushed to a snapshot LUN or target volume 504. Specifically, at time T1+delta desired blocks (i.e., dirty blocks) are selected from source volume 502 and are backed up to target volume 504. Similarly, at time T2 desired blocks (i.e., dirty blocks) are again selected from source volume 502 and are again backed up to target volume 504. It should be appreciated that blocks that contain data prior to the snapshot are not written from source volume 502 to target volume 504 during the snapshot. That is, only data that has changed (i.e., dirty blocks) are written from source volume 502 to the target volume 504 during a snapshot.

With conventional merging of delta files, an entire volume is reconstituted and written to a single contiguous volume space. That is, a new copy of all delta files is generated for an entire original volume. I/O read operations are then performed on the new copy to retrieve desired information which generates a relatively large number of writes and then some reads on the new copy. According to the present disclosure, only blocks that have been modified are maintained on a backup volume. When a specific file is requested from the backup volume, a read I/O operation is performed directly on the backup volume that maintains the dirty blocks. More specifically, a real-time operation is initiated in which clean blocks are read from an original volume and dirty blocks are read from a backup volume. In this case, the reconciliation of many I/O writes to a secondary disk is avoided.

According to one embodiment of the present disclosure, a process to optimize the backup and recovery workflows may include a user selecting to backup a workload (e.g., a cloud workload), which may include a virtual machine (VM), a set of VMs, and/or management subsystems. Files related to workload to be backed up are enumerated in a file set 'Ef', with an enumeration of storage volumes 'Ev' that include data related to the enumerated files being identified. For each storage volume in 'Ev' a size of a source volume 'S' is determined and a target volume 'T' (with an identical size of the source volume 'S') is provisioned. The fact that the target volume 'T' is a thin-provisioned volume reduces required I/O and enables faster backup time while minimizing impact on other workloads on shared storage. As the virtual disk does not expand dynamically, the actual capacity requirement is fixed and sufficient to contain dirty blocks that occur.

A volume level clone (or snapshot) from a source volume 'S' to a target volume 'T' may be initiated with a specific snapshot feature that indicates that any data to synchronize the volumes is not to be copied. For example, on Storwize® systems a volume FlashCopy property 'copy rate' may be set equal to zero to indicate that data to synchronize volumes is not to be copied. As a result, the target volume 'T' only includes mapping entries of dirty blocks for the source volume 'S' and the dirty blocks, which results in minimizing I/O cost. That is, the target volume 'T' only includes any blocks that become dirty in the source volume 'S'. The target volume 'T' can then be mounted in the backup management system and the dirty blocks of the enumerated files 'Ef' may then be copied onto a backup medium (offsite, tape, additional volume, etc.).

Following copying of the dirty blocks of the enumerated files 'Ef' to the backup medium, the target volume 'T' may then be unmounted and deleted. Subsequent to the deletion of the target volume 'T', an indication is provided to the user that backup is complete. Given a restoration point, the restoration operation is straight-forward as the dirty blocks of the enumerated files 'Ef' may be copied directly from the backup medium onto the original source volume 'S'. In contrast, using conventional approaches, additional steps to merge snapshots have been required that have incurred significant I/O (and time) in order to complete a restoration operation backup.

Figure 6:
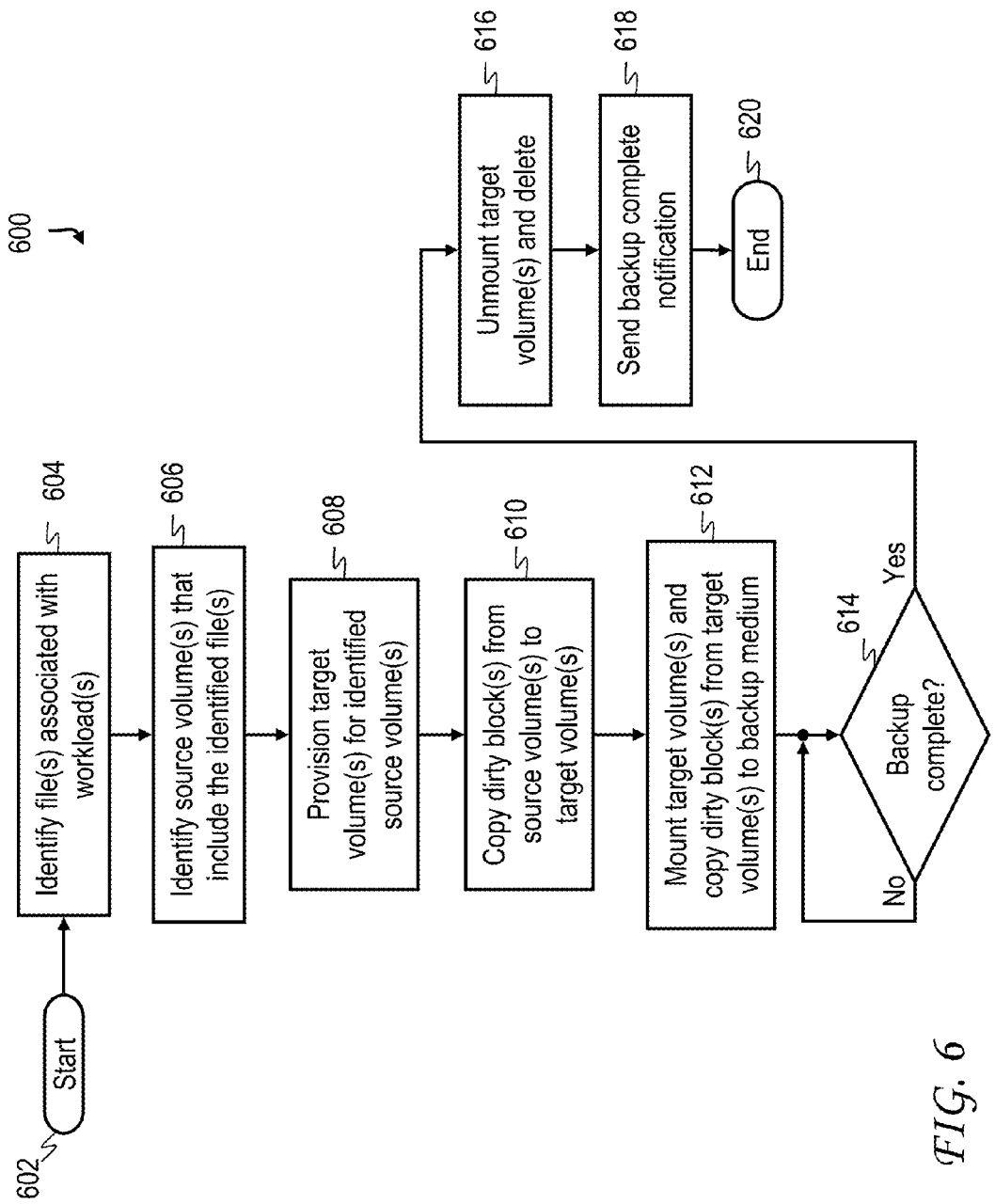
FIG. 6 is a flowchart of an exemplary process that implements techniques for optimizing backup workflows according to various embodiments of the present disclosure.

With reference to FIG. 6, an exemplary process 600 is illustrated that implements techniques for optimizing backup workflows according to various embodiments of the present disclosure. As one example, a hypervisor of management layer 64 (see FIG. 3) executing on processor 16 of server 12 may implement process 600, which may take the form of one or more program modules 42 (see FIG. 1).

Process 600 may, for example, be initiated in block 602 in response to a user requesting a backup of an associated VM. Next, in block 604, processor 16 identifies one or more files associated with the VM. Then, in block 606, processor 16 identifies one or more source volumes associated with the one or more identified files. Next, in block 608, processor 16 provisions a respective target volume for each of the source volumes.

As one example, the VM may have three files associated with a workload of the VM and the three files may, for example, be associated with three different source volumes. In this case, processor 16 provisions three target volumes, i.e., one target volume for each of the source volumes. In at least one embodiment, a size of each of the target volumes corresponds to a size of an associated source volume. For example, assume that a first source volume has a size of 256 TB, a second source volume has a size of 64 TB, and a third source volume has a size of 128 TB. In this case, a first target volume with a 256 TB size is provisioned, a second target volume with a 64 TB size is provisioned, and a third target volume with a 128 TB size is provisioned. As another example, the VM may have four files associated with a workload of the VM and the four files may, for example, be associated with two different source volumes. In this case, processor 16 provisions two target volumes. As yet another example, the VM may have five files associated with a workload of the VM and the five files may, for example, be associated with a single source volume. In this case, processor 16 provisions one target volume.

Then, in block 610, processor 16 copies dirty blocks (associated with the files identified at block 604), from the source volume(s) to their respective target volume(s). In various embodiments, the copying is performed in a snapshot mode that prevents an update to the source volume(s) during the snapshot mode. Next, in block 612, processor 16 mounts the target volume(s) in the backup system, and the dirty blocks are copied from the target volume(s) to a backup medium. Then, in decision block 614, processor 16 determines whether the backup is complete. In response to the backup not being complete in block 614, control loops on block 614. In response to the backup being complete in block 614, control transfers from block 614 to block 616. In block 616, processor 16 unmounts the target volume(s) and deletes the target volume(s). Next, in block 618, processor 16 sends a backup complete notification to the user to inform the user that the backup was successful. Following block 618 process 600 terminates in block 620 until a next backup request is received.

Figure 7:
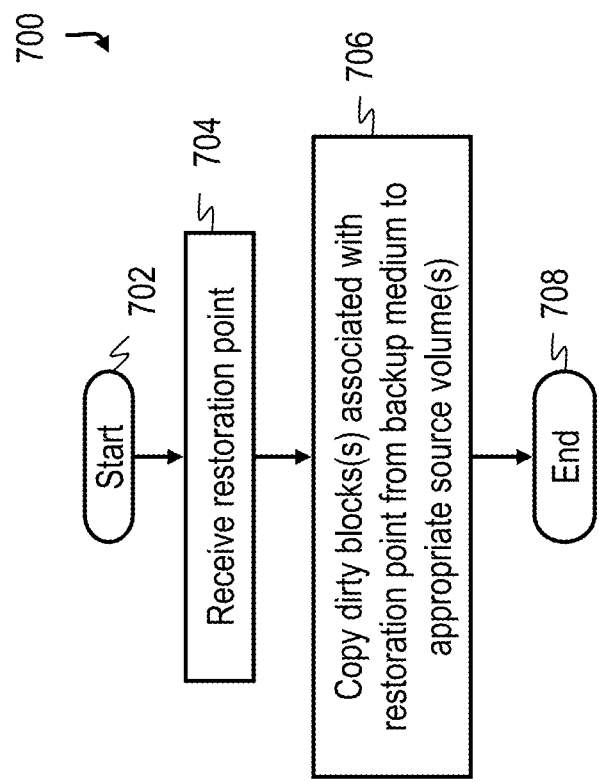
FIG. 7 is a flowchart of an exemplary process that implements techniques for optimizing recovery workflows according to various embodiments of the present disclosure.

With reference to FIG. 7, a process 700 that implements techniques for optimizing recovery workflows according to various embodiments of the present disclosure is illustrated. Specifically, process 700 restores a VM using backup data retrieved from a backup medium. As one example, a hypervisor of management layer 64 (see FIG. 3) executing on processor 16 of server 12 may implement process 700, which may take the form of one or more program modules 42 (see FIG. 1).

Process 700 may, for example, be initiated in block 702 in response to a user requesting a restoration of a VM. Next, in block 704, processor 16 receives a restoration point for the VM that is to be restored. Then, in block 706, processor 16 copies dirty blocks associated with the restoration point from the backup medium to one or more appropriate source volumes. Following block 706 control transfers to block 708, where process 700 terminates until a next restore request is received.

It should be appreciated a restore operation according to the present disclosure does not require any 'merge' operations. That is, a restore operation according to the present disclosure only requires a single copy move operation for each file to be restored. When a specific file is requested from a backup volume, a read I/O operation is performed directly on the backup volume that maintains the dirty block. That is, a real-time operation is initiated in which clean blocks are read from (a copy of) an original volume and dirty blocks are read from a backup volume. In this case, the reconciliation of many I/O writes to a secondary disk is avoided.

Accordingly, techniques have been disclosed herein that optimize backup and recovery workflows. In general, the disclosed techniques employ coarse-grained volume snapshots for virtual machine backup and restore while minimizing performance impact and virtual disk footprint.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer program product for backing up a workload in a virtual environment, the computer program product comprising:
   a computer-readable storage device; and
   computer-readable program code embodied on the computer-readable storage device, wherein the computer-readable program code, when executed by a processor, configures the processor to:
      identify one or more files that are associated with the workload;
      identify one or more source volumes that include the one or more files;
      provision a respective target volume for each of the one or more source volumes identified;
      copy in a snapshot mode that prevents an update to the one or more source volumes during the snapshot mode only dirty blocks from each of the one or more source volumes to its respective target volume; and
      copy the dirty blocks from each target volume to a backup medium.

2. The computer program product of claim 1, wherein the copying in a snapshot mode includes copying the dirty blocks utilizing a hardware-assisted volume snapshot.

3. The computer program product of claim 2, wherein the computer-readable program code, when executed by the processor, further configures the processor to:
   set a 'copy rate' property for the hardware-assisted volume snapshot equal to zero to indicate that data to synchronize the source and target volumes is not to be copied.

4. The computer program product of claim 1, wherein the computer-readable program code, when executed by the processor, further configures the processor to:
   unmount and delete each target volume subsequent to copying the dirty blocks from each target volume to the backup medium.

5. The computer program product of claim 1, wherein the computer-readable program code, when executed by the processor, further configures the processor to:
   provision each target volume with a same size as an associated one of the one or more source volumes.

6. The computer program product of claim 1, wherein the computer-readable program code, when executed by the processor, further configures the processor to:
   restore the one or more files to the one or more source volumes using the dirty blocks from the backup medium.

7. The computer program product of claim 1, wherein the one or more source volumes correspond to a single source volume having a corresponding single target volume that is a thin-provisioned volume.

8. A data processing system, comprising:
   a memory; and
   a processor coupled to the memory, wherein the processor is configured to:
      identify one or more files that are associated with the workload;
      identify one or more source volumes that include the one or more files;
      provision a respective target volume for each of the one or more source volumes identified;
      copy in a snapshot mode that prevents an update to the one or more source volumes during the snapshot mode only dirty blocks from each of the one or more source volumes to its respective target volume; and
      copy the dirty blocks from each target volume to a backup medium.

9. The data processing system of claim 8, wherein the copying in a snapshot mode includes copying the dirty blocks utilizing a hardware-assisted volume snapshot.

10. The data processing system of claim 9, wherein the processor is further configured to:
    set a 'copy rate' property for the hardware-assisted volume snapshot equal to zero to indicate that data to synchronize the source and target volumes is not to be copied.

11. The data processing system of claim 8, wherein the processor is further configured to:
    unmount and delete each target volume subsequent to copying the dirty blocks from each target volume to the backup medium.

12. The data processing system of claim 8, wherein the processor is further configured to:
    provision each target volume with a same size as an associated one of the one or more source volumes.

13. The data processing system of claim 8, wherein the processor is further configured to:
    restore the one or more files to the one or more source volumes using the dirty blocks from the backup medium.

* * * * *